A. E. CUSTER.
PLACER MINING MACHINE.
APPLICATION FILED NOV. 29, 1913.
1,121,985.
Patented Dec. 22, 1914.
2 SHEETS—SHEET 1.
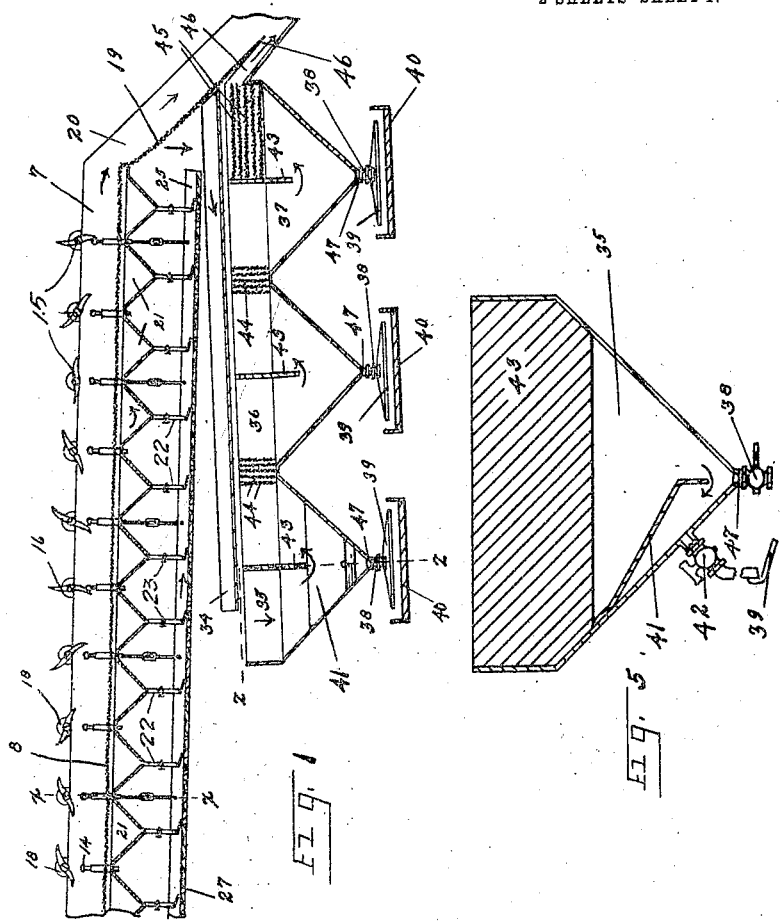
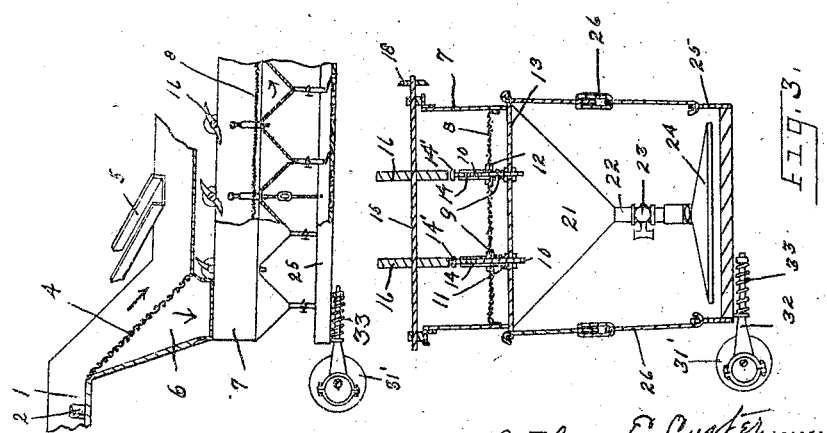

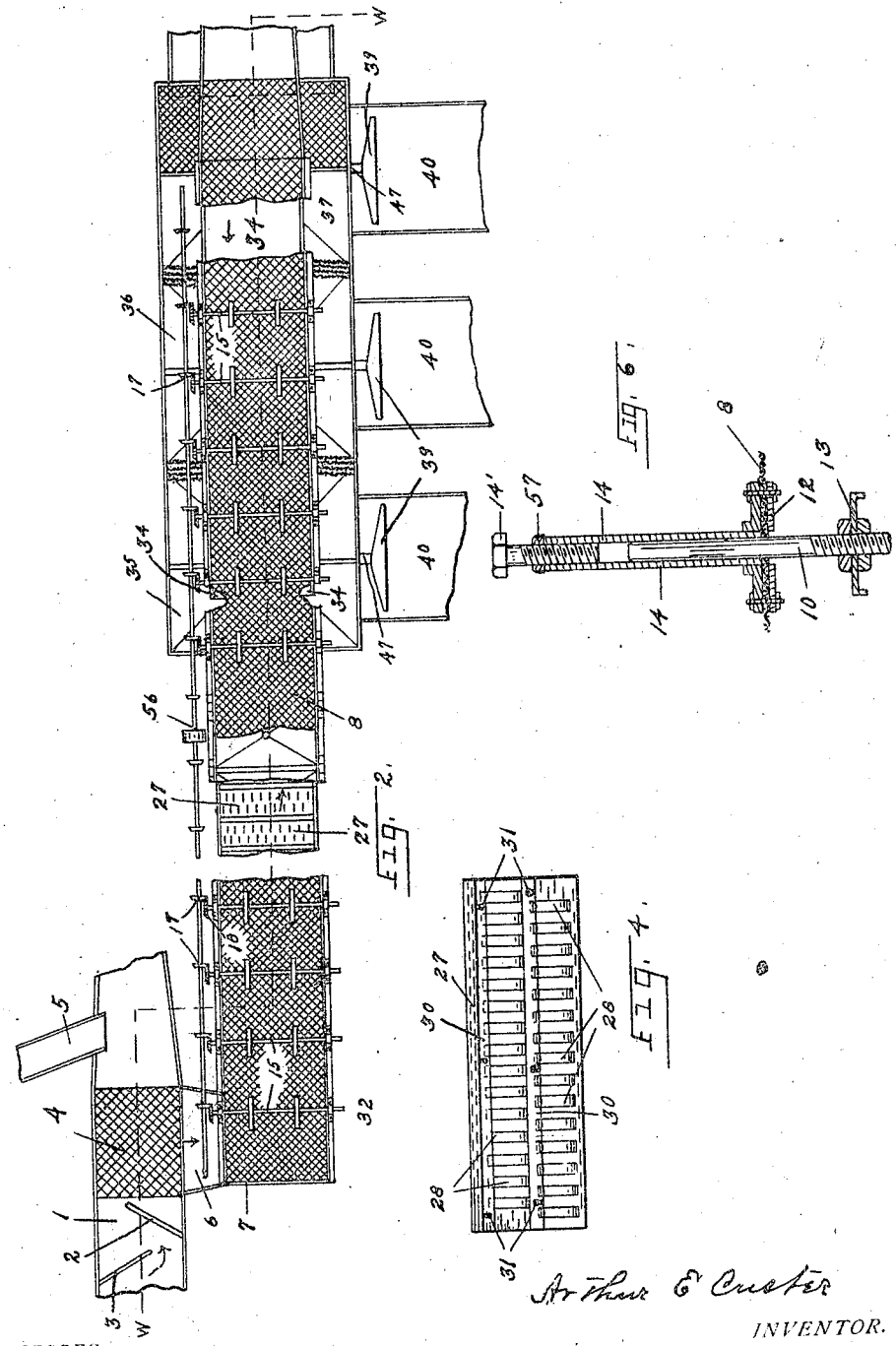

UNITED STATES PATENT OFFICE.

ARTHUR E. CUSTER, OF SALT LAKE CITY, UTAH.

PLACER-MINING MACHINE.

1,121,985.     Specification of Letters Patent.     Patented Dec. 22, 1914.

Application filed November 29, 1913. Serial No. 803,860.

*To all whom it may concern:*

Be it known that I, ARTHUR E. CUSTER, a citizen of the United States, residing at Salt Lake City, in the county of Salt Lake and State of Utah, have invented certain new and useful Improvements in Placer-Mining Machines, of which the following is a specification.

My invention relates to placer mining machines, and has for its object to provide a machine which will economically separate the gold and other precious metals from sand and gravel.

A further object is to separate and save the coated, flake and floating particles of gold from the sand, gravel and water in which they are found.

These objects I accomplish with the machine illustrated in the accompanying drawings in which similar numerals of reference indicate like parts throughout the several figures and as described in the specification forming a part of this application and pointed out in the appended claims.

In the drawings, wherein I have shown a substantial embodiment of my machine, Figure 1 is a broken view thereof, partly in section. Fig. 2 is a plan view of the same, parts cut away. Fig. 3 is a vertical section on line X X of Fig. 1. Fig. 4 is an enlarged plan view of a portion of the riffles used in the amalgamator. Fig. 5 is a vertical section of one of the settling tanks on line Z—Z of Fig. 1, showing the mercury trap and clean-up basin. Fig. 6 is an enlarged vertical section in detail of the screen holding and vibrating mechanism.

In the placer fields in which I have been operating and in many other fields in the western portion of the United States, the placer gold is found associated with other precious metals, namely, platinum, thorite, monazite, zircon, ilmenite, etc. The particles of mineral, gold, platinum, etc., are frequently coated with oil and other substances as a film which so completely envelops the particles of metal that they will float and be carried in flowing water. Other particles of gold in the same placer fields are very fine and flattened or thin in shape, so much so, that they are called flake gold, and will float or be carried in flowing water. This flake gold, especially if coated as above described, cannot be caught by the usual means and in the usual placer mining manner. As an operator in said fields and to meet and overcome such conditions, I have invented and am successfully using the machine illustrated in the drawings, wherein I first separate the coarser gravel and sand from the finer particles and minerals and at the same time and with the same elements of my machine I scour and cleanse the metal particles of said oil and foreign substances. Thereafter in other portions of the same machine, and as a part of the same operation, I separate the valuable metals and minerals, including the flake and coated particles, which could not be accomplished without such scouring by such or other mechanical means. It is absolutely essential and necessary to give the combined treatment and manipulation as above indicated and hereinafter described, to this class of placer deposits, to effect and accomplish an economical and commercial saving of said metals and minerals.

In my machine the mineral bearing sand and gravel is fed into an inclined sluiceway 1, in which is a stream of flowing water. In said sluiceway are secured baffle dams 2, alternately with dams 3, in staggered relation to each other. The dams 3 are not as high as dams 2 and both are positioned at an angle to said sluiceway. The purpose of said dams is to change the direction and movement of the gravel, as it is carried along by the water, to cause a grinding of the finer material by the coarser. A portion of said sluiceway is set at an incline of about 45 degrees and the bottom of that portion is a coarse meshed wire screen 4, through which the water and finer material passes. The coarser material is carried, in said sluiceway by additional water supplied through another sluice box 5, to the tailings dump. The material passing through said screen 4 falls into a subjacently extending lateral chute 6, and is dumped therefrom into the head of another slightly inclined sluice box 7. A vibrating screen 8, parallel with and practically covering the bottom of said sluice box 7, is supported by springs 9. Said springs are carried on guide rods 10, which are vertically mounted on and through the crossties 13, which are transversely positioned and suitably spaced apart throughout the length of said sluice box 7. Threaded floor plates 11 through which said rods are inserted form a bottom bearing for said springs 9, and bearing caps 12 rest on said springs and support the cross ties 13, under said screen 8. Vertically movable sleeves 14 are operated over the upper portions of said rods 10, and are held in place by short bolts inserted therethrough and through the said bearing caps 12 and thereby said screen 8 is gripped. Said sleeves 14 are internally threaded and a threaded plunger cap 14' is screwed in each. Said caps receive the cam friction and have a jam nut 57 on each, by which they are set, whereby they may be turned to adjust the length without said sleeves, and by which the blow of the cam on the cap portion may be regulated. When worn they are removed and may be cheaply replaced. Mounted on the side walls of said sluice box 7, in suitable bearings are the cam shafts 15, on which are fastened the cams 16. A driving shaft 56 is mounted on and is parallel with one side of said sluice box 7; on which shaft are secured bevel gears 17, that mesh with and impart a motion to bevel pinions 18, which are secured on said cam shafts 15, and by which motion is imparted to said screen 8. Said cams 16 are so adjusted on said shafts 15 that the blows or impacts thereof are not all delivered at the same instant and a knocking undulatory motion is thereby imparted to said screen 8, which motion, with the slight inclination of the screen, moves the coarser sand particles through said sluice box over said screen 8 to a portion 19 thereof which is set at an incline of 45 degrees and by which said coarse sand is dumped into a tailings chute 20 and carried away. The bottom of said sluice box 7 is formed into a plurality of inverted pyramidically shaped hoppers or tanks 21, preferably equal in number and positioned between the agitating means above described. In the bottom of each of said tanks 21, a discharge pipe 22 is provided, having a valve 23 therein. Each of said pipes has a nose piece 24 fitted on its lower end by which some of the finer sand particles, with the valuable metals and minerals which have passed through said screen 8 are drawn off, through the said pipes 22, and distributed throughout the riffle box 25, which is suspended from and beneath said sluice box 7. Said riffle box 25 is supported by linked turnbuckles 26, having one end of each hooked through the outer ends of said crossties 13 and the lower end hooked to the sides of said riffle box 25. By such support said riffle box is free to move in a limited way in any lateral direction and may thereby be vertically adjusted. A series of riffle boards 27, equal in length to the width of said riffle box are placed side by side as a false or removable bottom in said box. Each of said boards has a plurality of spaced-apart recesses 28, formed in its upper side or face, transversely positioned as to the individual board and longitudinally as to the entire riffle box, and staggered in relation to each other. On the same face of each of said riffle boards 27, are formed small spaced-apart vertical lugs, at right angles to said recesses 28. Adjustable lip plates 30, are fastened across the ends of said recesses 28, which, by means of slotted holes 31, cut therein, may be moved to form a covering for a portion of said recesses 28, to retain the mercury in said recesses which is carried therein, when the riffle box is given the lateral movements hereinafter described. A vibratory motion is given to said riffle box and its contents by means of eccentrics 31', to which motion is imparted by the usual means (not shown) and which are mounted on said box, two on the side and one at the end. Each eccentric rod 32 carries a spring 33, thereon, by which the motion given to the said box is cushioned in one direction. The reciprocatory movement of said eccentrics is regulated as to time, in order that the one at the end of the box will move relatively later than the ones at the sides. This order of movement will give the middle portion of said riffle box 25 a circular motion, as the box has considerable length and the material of which it is constructed permits it to bend laterally, as also allowed by the turnbuckle suspension; thereby tending to give a movement to the middle portion of said sluice box similar to the old gold panning motion.

As stated, in the preamble to the specification, the placer ground in which I have been operating has considerable gold which has a tendency to float, caused by its fine and flaky form and by a coating or film surrounding each particle, the treatment and manipulation which has been given the said coated mineral particles, as above described, in the sluiceway 1, the sluicebox 7, and riffle box 25, breaks said coating and wears away said oily and other substances to such an extent that a large part of the gold will be caught on the riffles 29, and in the recesses 28. The finest of the mineral bearing material, in the nature of slimes, fine particles of sand, flake and floating gold, with the water and all floured and lost mercury, flows from the lower end of said riffle box 25, onto the return or distributer chute 34, and from there into the settling tanks 35, 36 and 37, respectively; which are formed similar to the said tanks 21, and have discharge pipes 47, in their bottoms with valves 38 therein, through which the mercury caught in said settling tanks may be emptied. To the side of said settling tank 35, is secured a baffle plate 41, with the lower edge or side a few inches above the discharge pipe 47. In the same side of said tank 35, and above the bottom edge of said baffle plate 41, a drain pipe 42, is secured, through which the heavier sand is drawn off to recover the other valuable metals and minerals, namely thorite, monazite, etc. In the lower end of each of said pipes 42, is secured a distributer 39, similar in form to the said nose pieces 24, by which the material discharged is spread over the tables, 40, which are placed thereunder. Vertical baffle boards, 43, are fastened in the upper portion of said tanks 35, 36 and 37, to check the current of water flowing through said tanks. A plurality of spaced-apart, vertical, oil-coated screens 44, are placed between said tanks 35, 36, and 37 and a number of said coated screens 45, are horizontally placed covering the overflow, discharge chute or opening 46, from said tank 37. Said screens 44, 45, are coated with a viscous oil or grease by dipping them into said viscous material before they are placed in position; and any particle of gold which floats in the water is caught on said screens as the water passes through them in reaching said discharge chute 46.

The operation of my machine is as follows: With water flowing through the said sluiceway 1, the mineral bearing sand and gravel is dumped into said sluiceway. In the passage therethrough the baffle dams 2 and 3 cause it to be thrown from side to side of said sluiceway, thereby cleaning the coarser gravel and boulders of any metallic particles and scouring the coated gold and other valuable metals. Said coarse gravel is dewatered by the screen 4, which allows the finer particles of sand and all of the water and valuable metals to pass into the sluice-box 7, onto the screen 8. The greater portion of gold and other metals is deposited in the tanks 21 but the floating and flake gold is carried by the water from said tanks 21 down or toward the other end of said sluicebox 7. In passing through said tanks the gold particles, called colors, receive the action of the sand particles as carried along over said screens 8. Said screen 8 is given a vertical vibratory motion by means of said cams 16 striking said plunger caps 14'. Said motion is quickly down and relatively slower up, and keeps said screen cleaned, as the impulse or movement through the water washes the meshes and the inclination causes the sand to travel to the lower end. The travel of the sand is assisted by the motion of said screens; the bounding, rolling motion aids the travel, and less water is required to move the sand than would be necessary over a stationary screen. The flow from the bottom of each of said tanks 21 is regulated by the valves 23 and the material is disturbed by the nose pieces 24, over the riffle boards 27 in the riffle box 25. The sand that will not pass through the meshes of said screen 8 is carried over the said screen 19 at the end of said sluice box and is dewatered and falls into the tailings chute and is carried away by the water flowing from the settling tanks. The floating flake, and coated minerals with all of the water and the fine sand and slimes are carried in the return sluice-way 34 and fall into the settling tank 35. That portion of the water that carries the flake and floating metals passes under the baffle boards 43, through the oil coated screens 44 and 45 and through the discharge chute and carries the sand from screen 19 away through the sluice way 20. The flake and floating metals are caught on said screens 44 and 45 by coming in contact with the viscous oiled meshes thereof. As previously stated, most of the gold and other metals are deposited in said tanks 21, wherein I have absolute control of the flow or feed therethrough of the sand, water and heavier metals to and over the riffles, and from which the heavier metals are drawn off, with enough water to move them, through the pipes 22 and to spread them over the riffle board 27. Mercury is placed in the recesses 28 in said riffle boards, and the lip plates 30 are adjusted to form pockets at the end of said recesses. Said riffle box 25 is given a circular vibratory motion and the gold is caught in said mercury and on the transverse riffles 29. Some of the said mercury is floured and is carried out of the riffle box 25, and with the slimes, and fine sand particles and with the other minerals that do not readily amalgamate with mercury is caught in said tank 35. A small flow of water is maintained through the drain pipes 42 and any particles of the valuable and rare metals that will not amalgamate pass under the lower edge of the baffle sides 41 in said tank and through said pipes 42 and are distributed to the concentrating table 40 ere der for treatment. The portion of said tank 35 which is below the outlet to pipe 42 catches the floured mercury and acts as a mercury trap, and also as a clean-up trap in the final clean-up which will be explained hereafter.

In cleaning up, the feed of gravel and sand is discontinued while the water is kept running until all of the sand and gravel is cleaned or washed out of the machine, then the valves in the settling tanks 35 are closed and the cleaning of the riffle box 25 is begun, the contents of the riffle boards 27 are dumped out into the riffle box and all the mercury, amalgam, and concentrates are washed out from the riffle boards with a hose and stiff brush. This cleaning up is begun at the lower end of riffle box 25 and is continued until the upper end is reached, after all the riffle boards are cleaned the riffle box 25 is washed clean and brushed down, everything including mercury, amalgam, and concentrates is washed down into the settling tank 35 when the mercury and amalgam is separated from the concentrate by gravity, the mercury and amalgam owing to their greater specific gravity displace the lighter material in the tank 35, and are drawn off through valve 47 into a suitable vessel and then the concentrates are drawn off through the same valve into a suitable vessel for further treatment. The mercury immediately after being drawn off is strained from the amalgam and the mercury is then recharged into the riffle boards and the machine is ready to resume operation. From this it will be seen that the tanks in connection with the machine are absolutely necessary as a means of cleaning up. The oiled screens 44 and 45 used for catching the fine floating gold are in duplicate sets and in cleaning up, one set is removed and the other set placed in position, and the set removed is cleaned and made ready for the next clean-up.

Having thus described my invention I desire to secure by Letters Patent and claim:

1. In a placer mining machine the combination of an inclined sluice box; a plurality of pyramidically shaped tanks forming a bottom in said sluice box; a screen in said sluice box forming a foraminous covering for said tanks; a valve controlled pipe in the bottom of each of said tanks; a riffle sluice suspended below and inclined in the same direction with said sluice box; and a nose piece on the lower end of each of said pipes and spaced along said sluice box, and adapted to deliver progressively finer grades of material at successive spaced parts of said riffle sluice from its head to its discharge end.

2. In a placer mining machine the combination of a sluice box into which screened gravel is dumped; a plurality of inverted pyramidically shaped tanks placed side by side to form a continuous bottom for said sluice box; a screen in said sluice box extended beyond the bottom at the lower end; a valve controlled pipe in the bottom of each of said tanks; a nose piece on the lower end of each of said pipes; a riffle sluice suspended below and parallel with said sluice box into which said nose pieces discharge progressively finer grades of material at successive, spaced parts of said riffle sluice from its head to its discharge end; a distributer sluice beneath said screen extension and riffle sluice and inclined in the reverse direction to them; and settling tanks beneath the said sluice box and riffle sluice into which said riffle sluice and screen extension discharge in common through said distributer sluice.

3. In a placer mining machine the combination of a sluice box; a dewatering screen at the delivery end of said sluice box; a plurality of tanks adjoining on their sides forming an undulating bottom in said sluice box; a screen covering said tanks to form a continuous foraminous diaphragm in said sluice box; means to separately discharge from each of the tanks progressively finer grades of material from each successive tank; a riffle box suspended below and parallel with said sluice box; and settling tanks beneath said dewatering screen and riffle box adapted to receive the discharge in common therefrom.

4. In a placer mining machine the combination of a sluice way; an inclined sluice box adapted to receive a portion of the discharge from said sluice way; a plurality of contiguous tanks forming a bottom for said sluice box; a screen within said sluice box forming a screen covering for said tanks; a riffle sluice box suspended beneath and parallel with said sluice box; and nose pieces on the bottoms of said tanks adapted to deliver successive and progressively graded material from said tanks from the head to the discharge end of said riffle sluice box.

5. In a placer mining machine the combination of an inclined sluice box having closed sides and one end; a plurality of inverted pyramidically shaped tanks placed side by side to form a bottom for said sluice box; means to conduct a sheet of mineral bearing gravel over said screen which will allow the finer particles to fall into said tanks; a valve controlled pipe in the bottom of each of said tanks to discharge therethrough; a riffle box suspended below and parallel with said sluice box; and a nose piece on the bottom of each of said pipes adapted to deliver progressively finer grades of said gravel at successive, spaced apart portions of said riffle box from its head to the discharge end thereof.

In testimony whereof I have affixed my signature in presence of two witnesses.

ARTHUR E. CUSTER.

Witnesses:
W. W. BARTON,
SAM RANEY.